United States Patent
Nagaoka et al.

(10) Patent No.: US 7,869,697 B2
(45) Date of Patent: Jan. 11, 2011

(54) PORTABLE IMAGE PICKUP DEVICE (75) Inventors: Shiro Nagaoka, Tokyo (JP); Toyokazu Aizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1150 days.

(21) Appl. No.: 11/505,449

(22) Filed: Aug. 17, 2006

(65) Prior Publication Data
US 2007/0147769 A1 Jun. 28, 2007

(30) Foreign Application Priority Data
Dec. 27, 2005 (JP) ............................. 2005-376269

(51) Int. Cl.
*H04N 9/80* (2006.01)
*H04N 5/76* (2006.01)

(52) U.S. Cl. .................. 386/248; 386/239; 386/240; 386/241; 348/231.1; 348/231.7; 348/231.8; 348/231.9; 348/231.99

(58) Field of Classification Search .................. 386/46, 386/52, 64, 65, 95, 123–126, 239, 240, 241, 386/248; 348/231.1, 231.7–231.9, 231.99
See application file for complete search history.

(56) References Cited

U.S. PATENT DOCUMENTS

| 6,577,811 | B1 | 6/2003 | Kikuchi et al. | |
| 6,611,903 | B2 * | 8/2003 | Fujimoto et al. | 711/162 |
| 7,245,822 | B2 * | 7/2007 | Shigaki | 386/83 |
| 2002/0191951 | A1 * | 12/2002 | Sodeyama et al. | 386/46 |
| 2003/0095195 | A1 | 5/2003 | Iwauchi | |
| 2003/0210898 | A1 | 11/2003 | Juen et al. | |
| 2006/0265426 | A1 * | 11/2006 | Chen | 707/200 |

FOREIGN PATENT DOCUMENTS

| CN | 1219272 A | 6/1999 |
| JP | 2002-027381 | 1/2002 |
| JP | 2003-158645 | 5/2003 |

OTHER PUBLICATIONS

Chinese Office Action with English translation, dated Jul. 18, 2008, for corresponding application, 17 pp.
Japanese Office Action dated Jul. 6, 2010.

* cited by examiner

*Primary Examiner*—Thai Tran
*Assistant Examiner*—Daquan Zhao
(74) *Attorney, Agent, or Firm*—Pillsbury Winthrop Shaw Pittman, =LLP (57) ABSTRACT

From a time point at which a storage capacity reaches a certain remaining capacity with respect to a limit value of 4 GB per one file depending on a file system, a subtraction time-managing portion (100A) changes photographing elapsed time display (174) which is displayed on a display picture of a liquid crystal display portion (17) to subtraction time display (178) in which residual time until 4 GB is reached is continuously subtracted in the inside of a portable image pickup device (1). Hence, a photographer can be visually informed of timing at which the photographing blank time period will occur. As a result, the photographer can be previously given the opportunity for the judgment about whether the photographing should be continuously performed or the current photographing should be ended to start new photographing.

6 Claims, 7 Drawing Sheets

PORTABLE IMAGE PICKUP DEVICE

The present application is based on Japanese patent application No. 2005-376269, the entire contents of which are incorporated herein by reference.

BACKGROUND OF THE INVENTION

1. Field of the Invention

The present invention relates to a portable image pickup device which is capable of capturing a still image and a moving image, and more particularly to a portable image pickup device which is capable of previously preventing a recording operation from being interrupted due to a restriction in a storage capacity depending on a file system.

2. Description of Related Art

A compact portable image pickup device which has a storage portion such as a large-capacity hard disc drive or a memory, and which can photograph a moving image in addition to a still image in a state of being held by one hand of a user has been proposed as a conventional portable image pickup device.

In such a portable image pickup device, while depending on a capacity of a storage portion, a lot of data on captured images can be stored in the storage portion without requiring a work such as a film exchange as in a conventional film camera. Thus, a user often only notices that the photographing is impossible when the storage capacity of the storage portion has been filled up. The portable image pickup device has a function of displaying data on a remaining capacity of the storage portion as means for previously preventing such a situation from being caused.

With regard to a file system for managing how a file is recorded in a storage portion for storing therein data on an image, a moving image and the like, a file allocation table (FAT) or a file allocation table 32 bit (FAT32) has been widely used as a file system which is high in general applications. However, there is a restriction in an amount of data per one file which can be created in such a file system. For example, an upper limit of an amount of data per one file in the FAT32 is decided as 4 GB in terms of the file storage standards. Thus, even when there is still a remaining capacity in the storage portion, an amount of data per one file does not exceed 4 GB at all. As a result, if data having a capacity exceeding 4 GB is recorded, it will be recorded straddling over a plurality of files.

As for an image pickup device in which a problem is dissolved that no data can be recorded any more in spite of existence of the remaining capacity in the storage medium, an image pickup device has been known in which the number of creatable files in a storage medium is calculated in accordance with the file storage standards, and the number of sheets of files for data recordable in the storage medium is calculated, and a value of the number of files which is smaller one between them is displayed as the number of sheets of the files for photographable images on a displaying portion in accordance with the comparison between them, and also this effect is alerted. This image pickup device, for example, is disclosed in the Japanese Patent Kokai No. 2003-158645.

However, according to the image pickup device disclosed in the Japanese Patent Kokai No. 2003-158645, the display cannot be previously made when an amount of data outputted from the image pickup element changes momentarily as in the case of the moving image. For example, during the photographing of the moving image for which a variable bit rate is selected in which an amount of data processed per unit time changes, an amount of data changes while the data is recorded. As a result, there is encountered such a problem that since an amount of data changes during the recording operation, it is difficult to precisely display information on recordable data, and when an amount of data used reaches 4 GB, a file in which the data is being recorded is closed due to the restriction in the FAT32 described above, and the recording operation is temporarily interrupted because the data must be continuously recorded in a new file.

SUMMARY OF THE INVENTION

In the light of the foregoing, it is an object of the present invention to provide a portable image pickup device which is capable of previously preventing a recording operation from being interrupted due to a restriction in a storage capacity depending on a file system.

In order to attain the above-mentioned object, according to one aspect of the present invention, there is provided a portable image pickup device, including: a recording portion for recording an image signal generated in accordance with a recording operation in a first file; and a subtraction time-managing portion for, when a ratio of an amount of data on the image signal recorded in the first file to a capacity per one file exceeds a given value, instructing a displaying portion to display a time in which the amount of data reaches the capacity.

In addition, in order to attain the above-mentioned object, according to another aspect of the present invention, there is provided a portable image pickup device, including: a recording portion for recording an image signal generated in accordance with a recording operation in a first file; and a subtraction time-managing portion for, when a ratio of an amount of data on the image signal obtained from a bit rate based on a quality of photographed image recorded in the first file to a capacity per one file exceeds a given value, instructing a displaying portion to display a time in which the amount of data reaches the capacity.

In addition, in order to attain the above-mentioned object, according to still another aspect of the present invention, there is provided a portable image pickup device, including: a recording portion for recording an image signal generated in accordance with a recording operation in a first file; and a subtraction time-managing portion for, when a ratio of an amount of data on the image signal determined from a bit rate based on a quality of photographed image being recorded in the first file to a capacity per one file exceeds a given value, instructing a displaying portion to change display of a time elapsed in the recording operation to display of a time in which the amount of data reaches the capacity.

Also, in order to attain the above-mentioned object, according to yet another aspect of the present invention, there is provided a portable image pickup device, including: a memory portion including a first file, a second file and files subsequent to the first and second files; a recording portion for recording an image signal generated in accordance with a recording operation in the first file; a subtraction time-managing portion for calculating a residual capacity of the first file by subtracting an amount of data recorded in the first file from a capacity of the first file, and calculating a residual time of the recording operation for the first file by dividing the residual capacity by a bit rate in the recording operation; and a displaying portion for displaying the residual time.

According to the present invention, it is possible to previously prevent the recording operation from being interrupted due to the restriction in the storage capacity depending on the file system.

DETAILED DESCRIPTION OF PREFERRED EMBODIMENTS

Figure 1A:
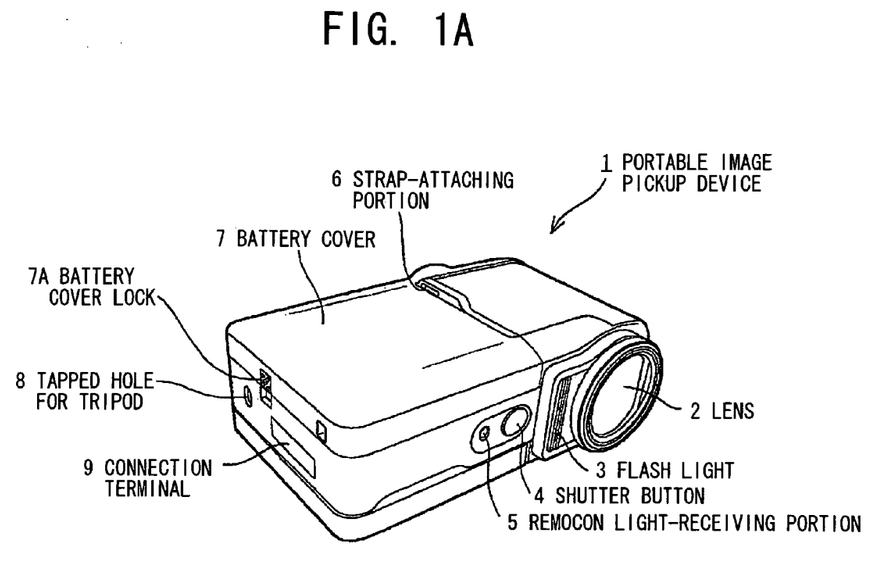
FIGS. 1A and 1B are respectively a perspective view when a portable image pickup device according to an embodiment of the present invention is viewed from a battery cover side, and a perspective view when the portable image pickup device shown in FIG. 1A is viewed from a liquid crystal display portion side.
Figure 1B:
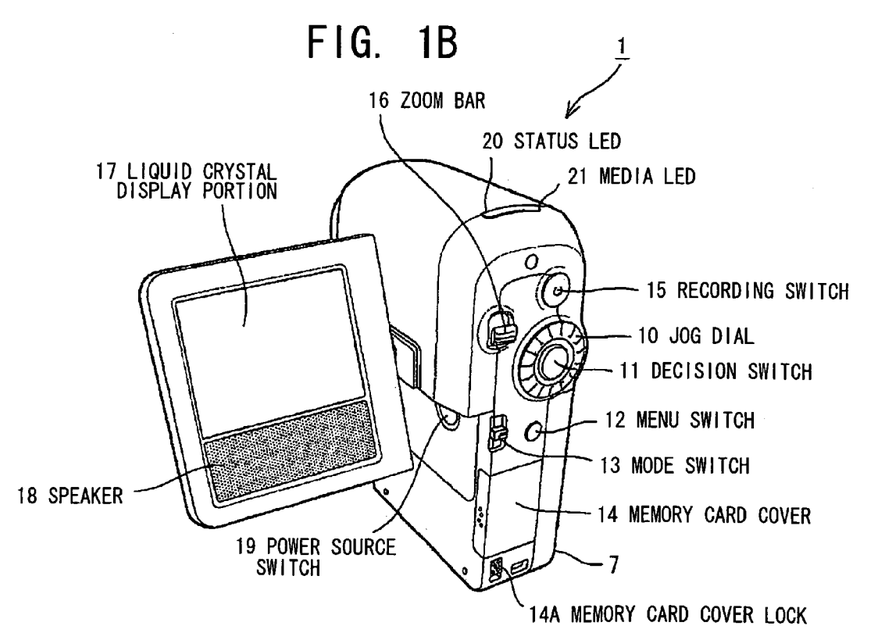

FIGS. 1A and 1B are respectively a perspective view when a portable image pickup device 1 according to an embodiment of the present invention is viewed from a battery cover side, and a perspective view when the portable image pickup device 1 shown in FIG. 1A is viewed from a liquid crystal display portion side.

[Construction of Portable Image Pickup device 1]

A portable image pickup device 1 includes a lens 2, a flash light 3, a shutter button 4 with which a still image is photographed, a light receiving portion 5 for receiving a light radiated from a light-emitting portion of a remocon device (not shown), a strap-attaching portion 6 into which a hand strap (not shown) is inserted for its attachment, a battery cover 7 which is movably attached to a main body, a tapped hole 8 for a tripod, a connection terminal 9 which is connected to a connection adapter (not shown), a jog dial 10 for selecting a desired one among set items about the portable image pickup device 1, and a decision switch 11 with which a decision manipulation is performed for various settings. Also, the portable image pickup device 1 includes a menu switch 12 with which various menus are displayed on a liquid crystal display portion 17 which will be described later, a mode switch 13 with which a reproduction mode and a recording (for a still image and a moving image) mode are switched to each other, a memory card cover 14 for protecting a memory card detachably inserted into a main body, a recording switch 15 with which a moving image is photographed, a zoom bar 16 with which a zooming manipulation is performed while a still image and a moving image are photographed, the liquid crystal display portion 17, a speaker 18 provided on a lower side of the liquid crystal display portion 17, a power source switch 19, a status LED 20 for showing an operation state of the liquid crystal display portion 17, and a media LED 21 which is turned ON in correspondence to a state of access to the memory card.

A still image is photographed by manipulating the shutter button 4 when the mode switch 13 is set to an image photographing mode. Focusing and exposure adjustment are performed by half-depressing the shutter button 4, so that data on ISO sensitivity, data on a shutter speed, and a stop value are displayed on the liquid crystal display portion 17. In addition, a still image can also be photographed by manipulating the shutter button 4 while a moving image is photographed.

The battery cover 7 prevents a lithium ion battery as a power source built in the main body from dropping out by its battery cover lock 7A.

A connection adapter (not shown) including a universal serial bus (UBS) terminal, a power source terminal, and an AV terminal is connected to the connection terminal 9, whereby an AV output and USB connection are made possible through the connection adapter.

The memory card cover 14 can be opened and closed by releasing the memory card cover lock 14A. In this embodiment, an SD memory card is used as the memory card.

A moving image is photographed by manipulating the recording switch 15 when the mode switch 13 is set to the photographing mode.

The liquid crystal display portion 17 is accommodated together with the speaker 18 in the same panel. This panel is closably and rotatably pivoted to the main body. In addition, in the accommodation state, a formation surface of the liquid crystal display portion 17 and the speaker 18 is directed to the main body side and a rear side thereof is flush with an external form of the main body.

The power source switch 19 is used when the portable image pickup device 1 is turned ON or OFF with the liquid crystal display portion 17 being opened. At that, in the portable image pickup device 1, the power source is turned ON by opening the liquid crystal display portion 17, while the power source is turned OFF by closing the liquid crystal display portion 17.

In the portable image pickup device 1, an imaging optical system and a solid state image pickup element which are not shown in FIGS. 1A and 1B are installed in an upper portion of the main body, i.e., in the rear of the lens 2. The solid state image pickup element corresponds to the photographing of a still image and a moving image.

Figure 2:
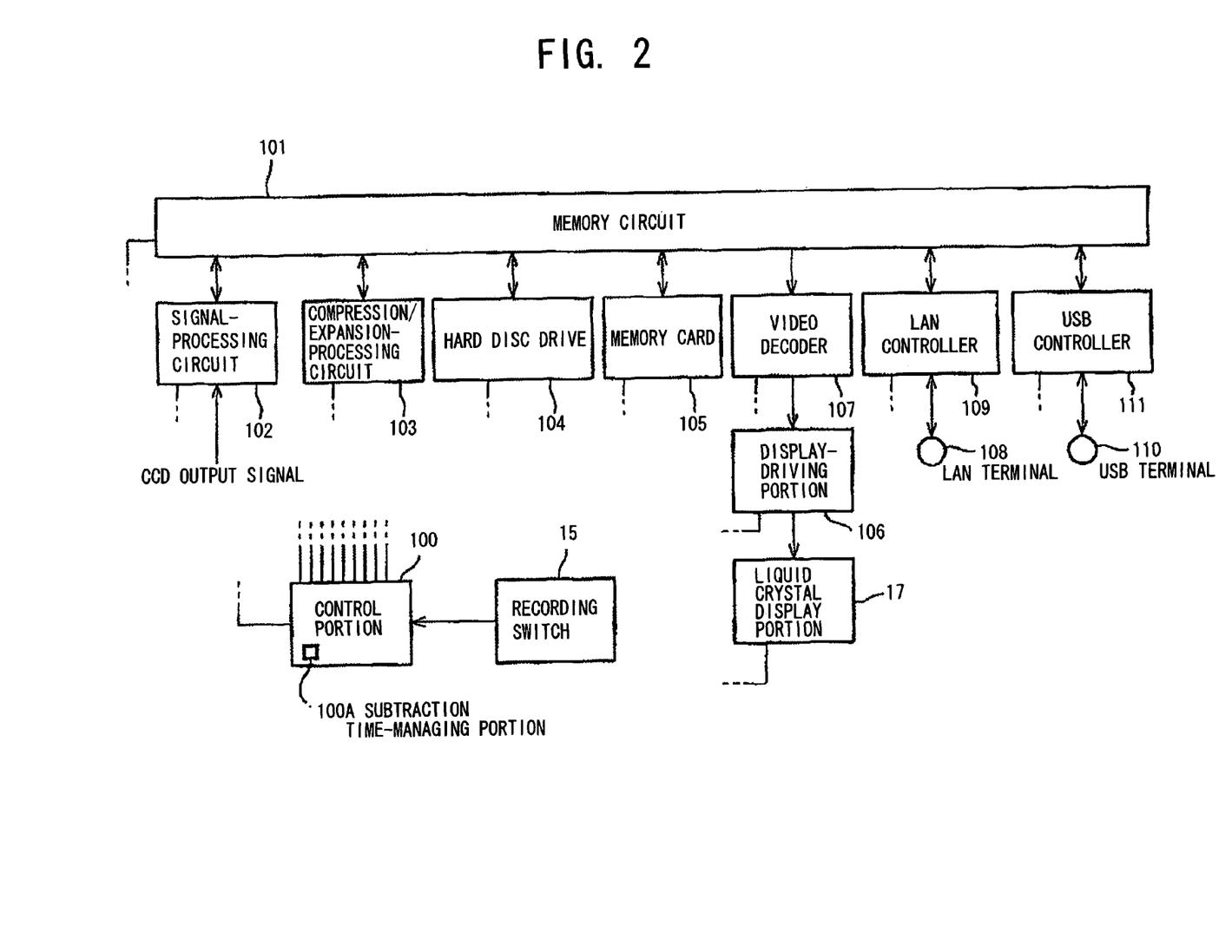
FIG. 2 is a block diagram of the portable image pickup device according to the embodiment of the present invention.

FIG. 2 is a block diagram of the portable image pickup device 1 according to the embodiment of the present invention. At that, only main portions of the portable image pickup device 1 are shown in the figure.

The block diagram of FIG. 2 mainly shows a system for processing an output signal from a charge-coupled device (CCD) based on a moving image photographed with the solid state image pickup element of the portable image pickup device 1. Thus, the portable image pickup device 1 further includes a control portion 100 for controlling operations of the portions, a memory circuit 101, a signal-processing circuit 102, a compression/expansion-processing circuit 103, a hard disc drive 104, a memory card 105, a display-driving portion 106, a video decoder 107, a local area network (LAN) controller 109 connected to a LAN terminal 108, and a USB controller 111 connected to a USB terminal 110.

The memory circuit 101 is provided between the control portion 100 and each of the portions, and serves to temporarily hold therein a signal which has a large amount of data and which is outputted from the control portion 100.

The signal-processing circuit 102 executes predetermined signal processing for the CCD output signal as an image signal.

The compression/expansion-processing circuit 103 executes processing for compressing/expanding the CCD output signal in correspondence to a still image or a moving image. In this embodiment, the compression/expansion-processing circuit 103 executes processing for compressing/expanding the still image in accordance with the joint photographic expert group (JPEG) standards. On the other hand, the compression/expansion-processing circuit 103 executes processing for compressing/expanding the moving image in accordance with motion picture expert group (MPEG) standards.

The hard disc drive 104 is a storage portion for managing data on a still image, data on a moving image, and other data which are recorded in accordance with the file system of the FAT32.

The video decoder 107 decodes the CCD output signal based on an image photographed with the solid state image pickup element (not shown) to process the resulting signal for display of the liquid crystal display portion 17, and outputs the resulting signal to the display-driving portion 106.

The LAN controller 109 of the portable image pickup device 1 transmits/receives control signals, and data on a still image or data on a moving image to/from an external apparatus through the LAN terminal 108.

The USB controller 111 transmits/receives data on a still image or data on a moving image to/from a personal computer (PS) or other electronic apparatus through the USB terminal 110.

In addition, the control portion 100 includes a subtraction time-managing portion 100A for, when an amount of data on a moving image file recorded in the hard disc drive 104 or the memory card 105 reaches 4 GB, instructing the liquid crystal display portion 17 to perform an operation for changing display about an elapsed time for photographing of a moving image which is made on a display picture of the liquid crystal display portion 17 to display about a subtraction time in which the amount of data will reach 4 GB in accordance with a predetermined condition.

The CCD output signal is converted into a digital signal in a A/D-converting portion (not shown), and the resulting digital signal is then inputted to the camera signal-processing circuit 102 to be subjected to predetermined signal processing in the camera signal-processing circuit 102. After that, the resulting signal is subjected to the compression processing in the compression/expansion-processing circuit 103, and is then recorded in the hard disc drive 104 or the memory card 105 through the memory circuit 101. At this time, the photographed image is displayed on the liquid crystal display portion 17 through the video decoder 107 and the display-driving portion 106.

In addition, during the reproducing operation, the data on the image read out from the hard disc drive 104 or the memory card 105 is inputted to the compression/expansion-processing circuit 103 through the memory circuit 101 to be subjected to the expansion processing in the compression/expansion-processing circuit 103. After that, the resulting data on the image concerned is outputted to the video decoder 107 through the memory circuit 101 and the image concerned is then displayed on the liquid crystal display portion 17 through the display-driving portion 106.

When data on a still image or data on a moving image which is recorded in the hard disc drive 104 or the memory card 105 is transferred or received to or from the external apparatus, the USB controller 111 transmits/receives the data to or from the external apparatus through the USB terminal 110.

Figure 3:
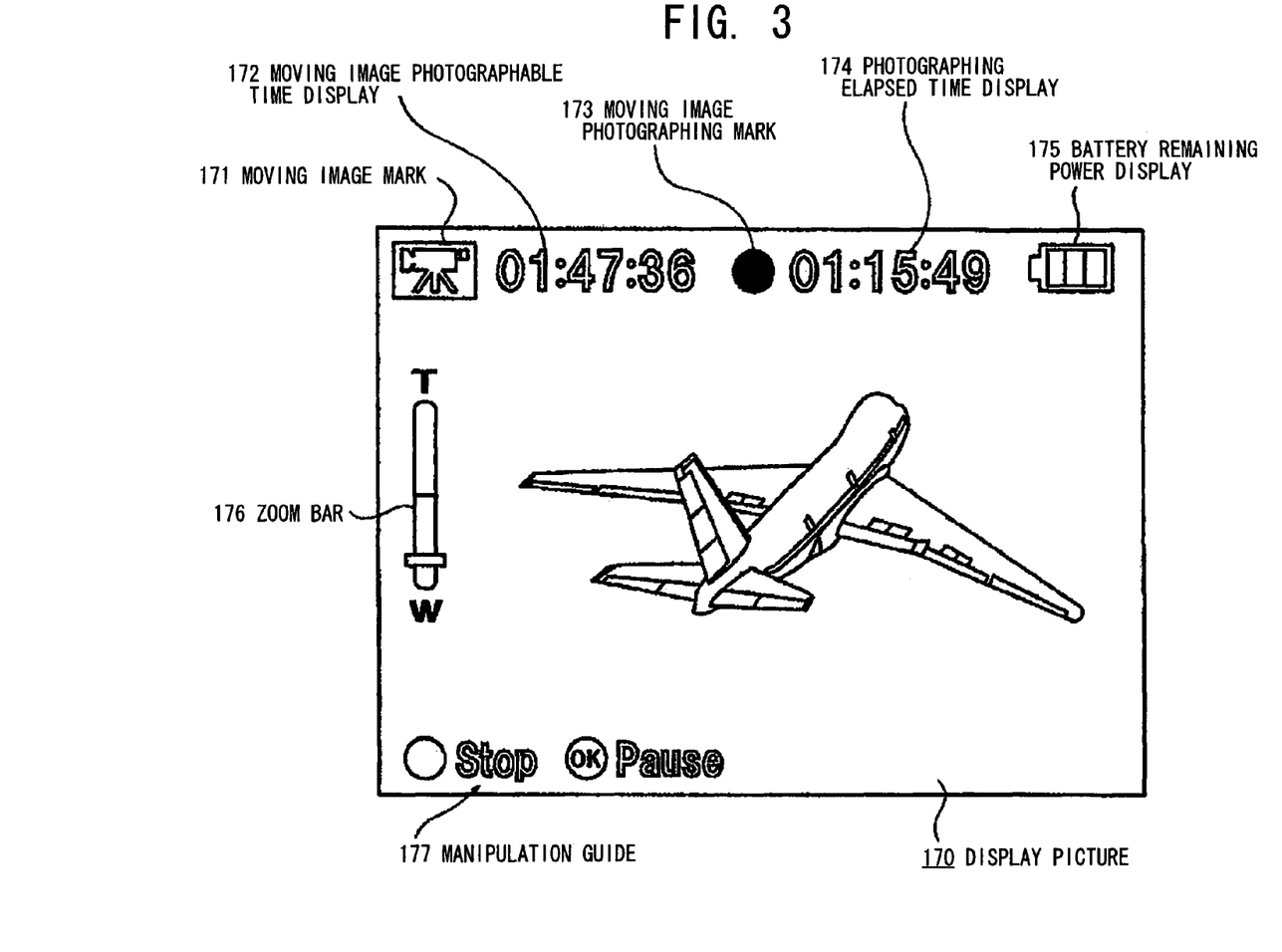
FIG. 3 is an operation explanatory view showing a display picture (including photographing elapsed time display) displayed on a liquid crystal display portion while a moving image is photographed.

FIG. 3 is an operation explanatory view showing a display picture displayed on the liquid crystal display portion 17 while a moving image is photographed. In the figure, the photographing elapsed time display is made on the display picture.

A display picture 170 while a moving image is photographed contains a moving image mark 171 representing that a mode is a moving image photographing mode, moving image photographable time display 172, a moving image photographing mark 173 representing that moving image is in the process of being photographed, photographing elapsed time display 174 representing an elapsed time from start of the photographing, battery remaining power display 175 representing a battery remaining power, a zoom bar 176 representing a degree of zoom based on a zoom manipulation, and a manipulation guide 177 showing representation about a manipulation system while a moving image is photographed.

In this case, since a sufficient remaining capacity against a capacity limit of 4 GB per one file exists for the moving photographable time, the photographing elapsed time display 174 is displayed with the same character color as that of the moving image photographable time display 172 in a normally turned ON state.

Figure 4:
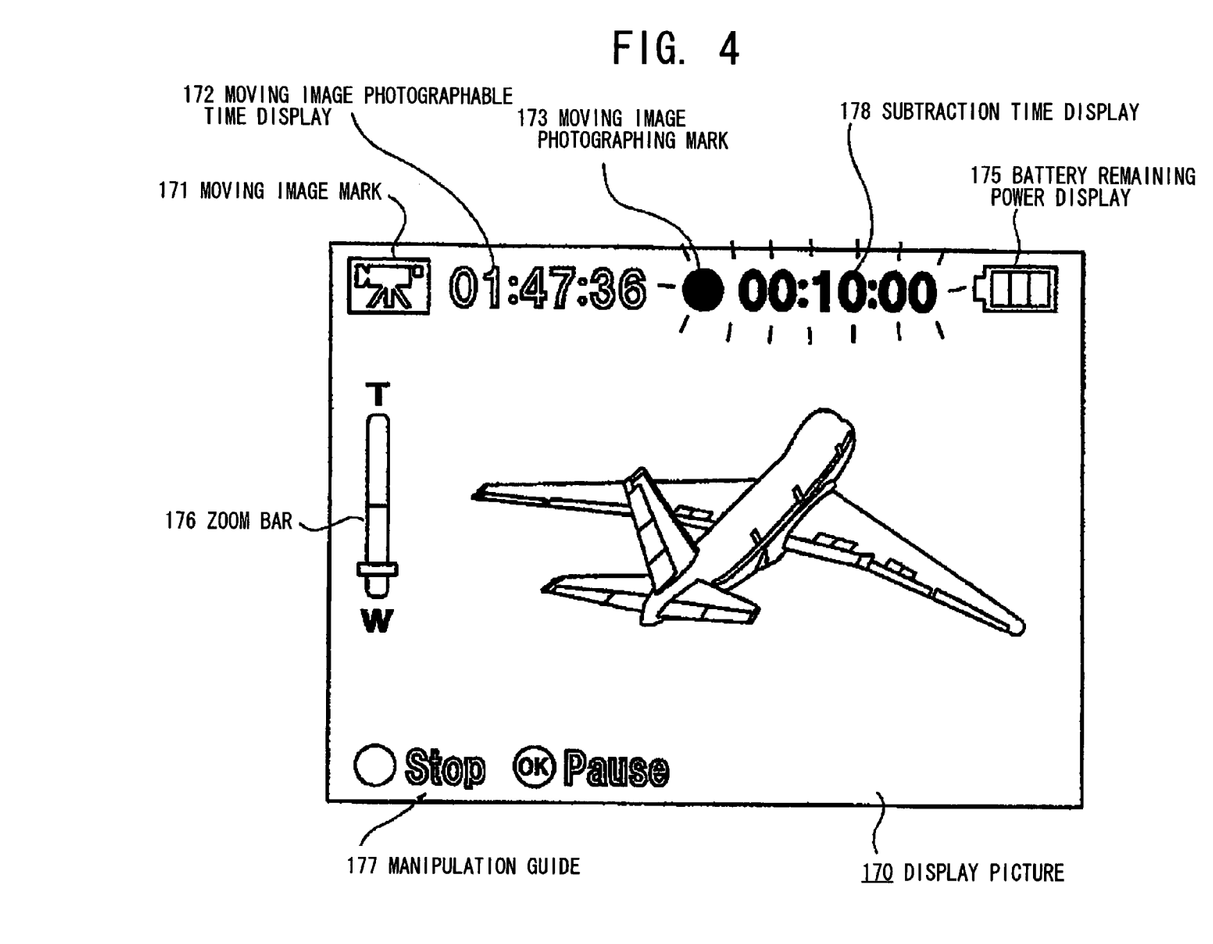
FIG. 4 is an operation explanatory view showing a display picture (including subtraction time display) displayed on the liquid crystal display portion while the moving image is photographed.

FIG. 4 is an operation explanatory view showing a display picture displayed on the liquid crystal display portion 17 while a moving image is photographed. In the figure, the subtraction time display 178 is made on the display picture.

In this case, the little remaining capacity against the capacity limit of 4 GB per one file exists for the moving image photographable time. Hence, this display picture corresponds to display in a state in which it is the predetermined time (10 minutes in the figure) to switch the display mode from the current display to warning display in correspondence to the remaining capacity. Thus, the subtraction time display 178 is displayed in a flickering state with a character color different from that of the moving image photographable time display 172. For example, the moving image photographable time display 172 can be displayed with a white color, and the subtraction time display 178 can be flickered with a red color.

Figure 5:
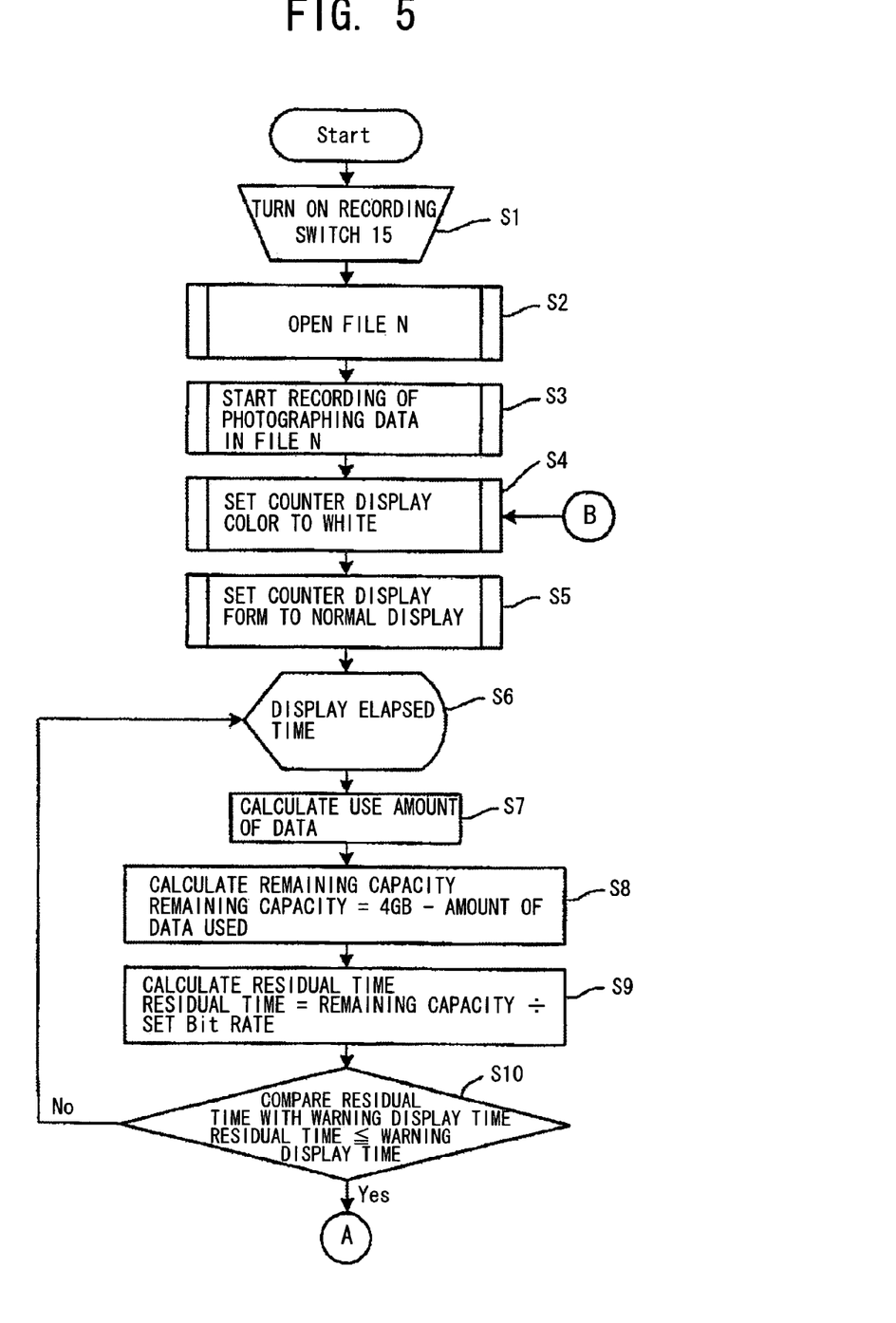
FIG. 5 is a flow chart showing an operation of the portable image pickup device according to the embodiment of the present invention.
Figure 6:
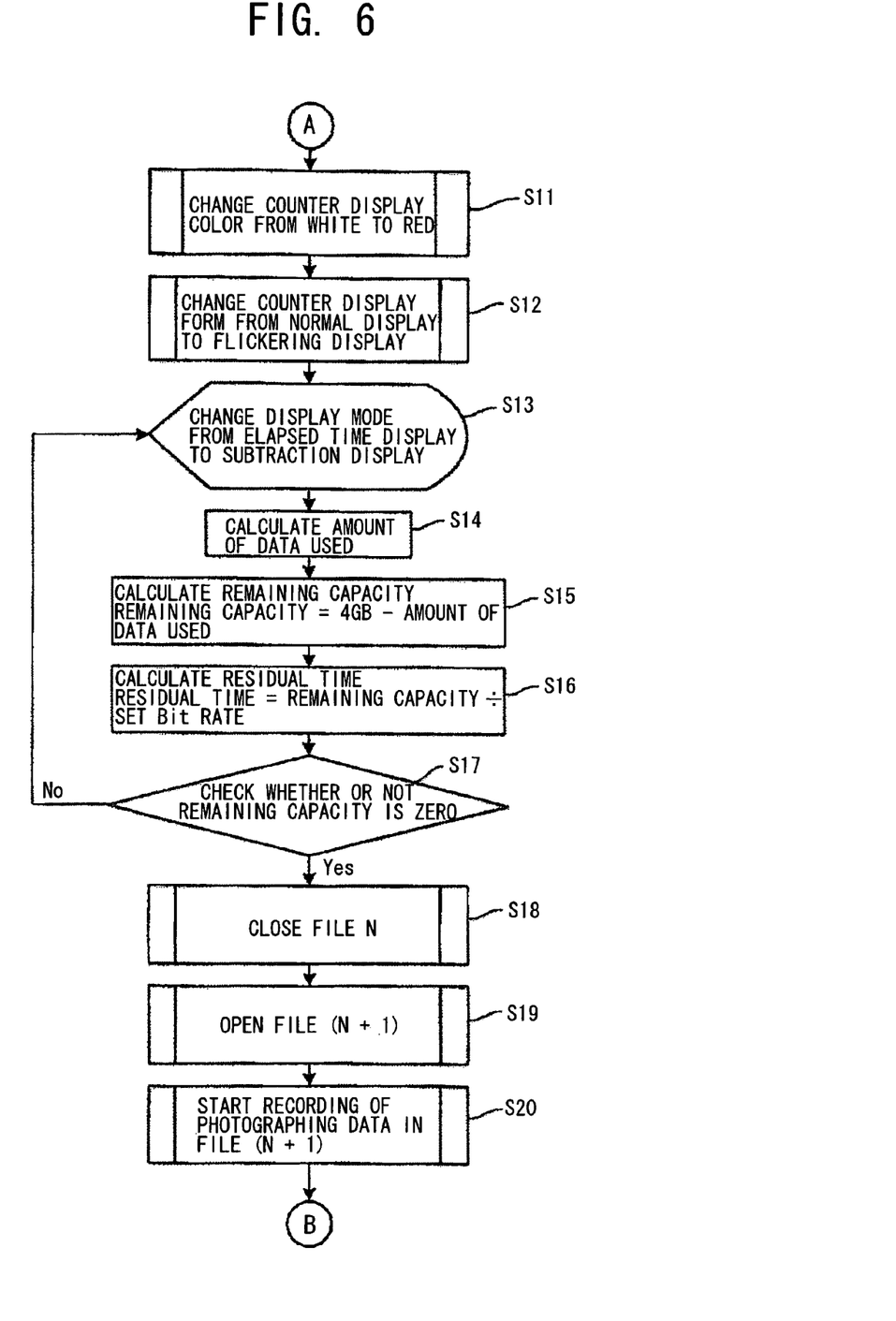
FIG. 6 is a flow chart showing an operation of the portable image pickup device according to the embodiment of the present invention.
Figure 7:
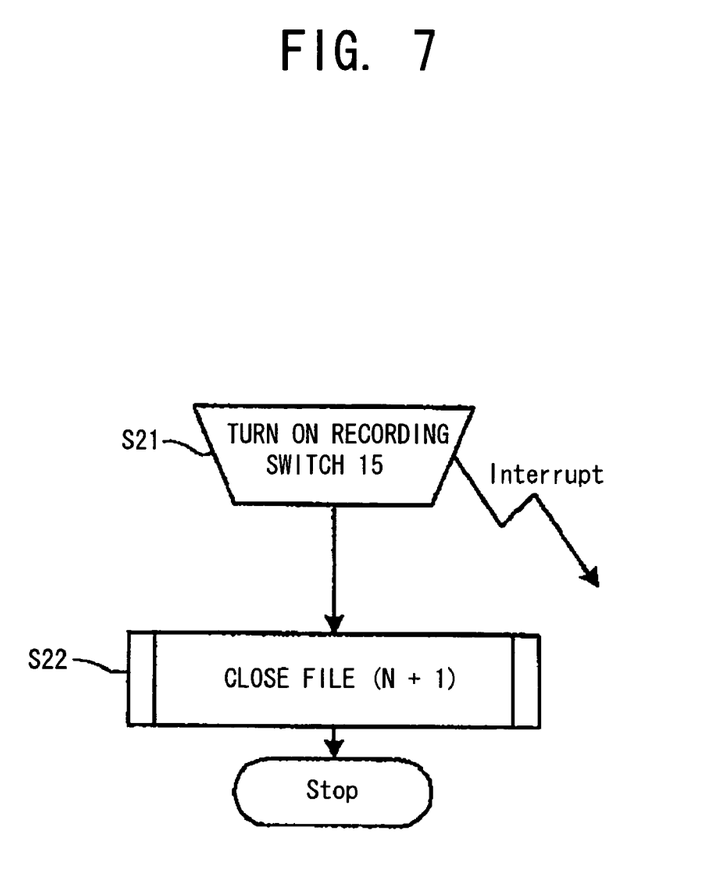
FIG. 7 is a flow chart showing an operation of the portable image pickup device according to the embodiment of the present invention.

An operation of the portable image pickup device 1 according to this embodiment of the present invention will hereinafter be described in detail with reference to flow charts shown in FIGS. 5 to 7, respectively.

Firstly, a moving image is started to be recorded by turning ON the recording switch 15 (S1). Next, the control portion 100 opens a file N in a predetermined storage region of the hard disc drive 104 (S2), and records photographing data in the file N (S3).

The sufficient remaining capacity against the capacity limit of 4 GB per one file exists at start of the photographing. Hence, the color of the characters (counter display) on the display picture 170 of the liquid crystal display portion 17 is set to white (S4), the counter display form is set to the photographing elapsed time display (S5), and the data on the elapsed time for the photographing is displayed on the liquid crystal display portion 17 (S8).

The control portion 100 calculates an amount of data used which is continuously recorded in the file N in real time concurrently with start of the photographing (S7), and subtracts the amount of data used thus calculated from 4 GB as the limit value for the capacity per one file to calculate the remaining capacity against 4 GB (S8).

Next, the control portion 100 calculates a residual time from a bit rate (set Bit rate) set in the moving image quality setting and the remaining capacity (S9).

Next, the control portion 100 compares the residual time thus calculated with the time (warning display time) at which the display mode should be changed from the current display to predetermined warning display (S10). Here, when the residual time is longer than the warning display time (S10: No), the control portion 100 judges that the display mode does not yet need to be changed from the current display to the warning display, and instructs the liquid crystal display portion 17 to display thereon the photographing elapsed time display 174 with the white characters.

On the other hand, when the residual time is equal to or shorter than the warning display time (S10: Yes), the control portion 100 judges that the operation enters the warning state, the subtraction time-managing portion 100A instructs the liquid crystal display portion 17 to change the character color from white to red (S11), instructs the liquid crystal display portion 17 to change the time display from the normal display to the flickering display (S12), and also instructs the liquid crystal display portion 17 to change the display mode from the photographing elapsed time display to the subtraction time display (S13).

The control portion 100 calculates in real time an amount of data used which is continuously recorded in the file N similarly to the case of the normal display (S14), and subtracts the amount of data used thus calculated from 4 GB as the limit value of the capacity per one file to calculate the remaining capacity against 4 GB (S15).

Next, the control portion 100 calculates the residual time from the set Bit rate set in the moving image quality setting and the remaining capacity (S16), and judges whether or not the residual time is zero (S17). Here, when the residual time is judged to be zero (S17: Yes), the control portion 100 judges that the data cannot be recorded in the file N any more. Then, the control portion 100 closes the file N (S18), opens a next file (N+1) (S19), and continuously records the photographing data in the next file (N+1) (S20). At this time, the control portion 100 instructs the liquid crystal display portion 17 to change its display mode from the subtraction time display to the photographing elapsed time display, instructs the liquid crystal display portion 17 to change the character color from red to white, and also instructs the liquid crystal display portion 17 to change the time display itself from the flickering display to the normal display.

On the other hand, when it is judged in S17 that the residual time is not zero (S17: No), the subtraction time-managing portion 100A continues to calculate the residual time while it instructs the liquid crystal display portion 17 to hold the subtraction time display as its display mode, instructs the liquid crystal display portion 17 to hold the white color as the character color, and also instructs the liquid crystal display portion 17 to hold the flickering display as the time display.

In addition, when the recording switch 15 is turned ON during the photographing (S21), the control portion 100 stops the photographing/recording operation in accordance with Interrupt, and closes the file (the file (N+1) in the figure) which is in the open state at that time (S22) to end the photographing operation.

According to this embodiment of the present invention, from a time point at which the storage capacity reaches a certain capacity with respect to the limit value of 4 GB per one file depending on the file system, the subtraction time-managing portion 100A changes the photographing elapsed time display 174 which is displayed on the display picture of the liquid crystal display portion 17 to the subtraction time display 178 in which the residual time until 4 GB is reached is continuously subtracted. Hence, a photographer can be visually informed of the timing at which the photographing blank time period will occur. As a result, the photographer can be previously given the opportunity for the judgment about whether the photographing should be continuously performed or the current photographing should be ended to start new photographing.

At that, in the embodiment described above, the description has been given with respect to the operation for changing the display of the display picture on the liquid crystal display portion 17 to another one in accordance with the judgment that the remaining capacity reaches a given capacity with respect to 4 GB as the upper limit of the storage capacity per one file in the FAT32 standards. However, the present invention is not intended to be limited thereto. That is to say, for example, a procedure may also be adopted such that from a time point at which the current capacity reaches a given remaining capacity with respect to a capacity (e.g., 2 GB) which is previously set by the photographer, the photographing elapsed time display 174 which is displayed on the display picture of the liquid crystal portion 17 is changed to the subtraction time display 178.

In addition, with respect to the display form as well for the subtraction time display 178, in addition to the method of displaying the subtraction time display 178 with the color different from that of the photographing elapsed time display 174 in the flickering state or the like, a method may also be adopted in which the subtraction time display 178 is made in a size larger than that of the photographing elapsed time display 174 as long as it urges the photographer to be effectively informed of the warning.

It should be noted that the present invention is not intended to be limited to the above-mentioned embodiment, and the various combinations and changes thereof can be made without departing from or changing the technical idea of the invention.

What is claimed is:

1. A portable image pickup device, comprising:
   a recording portion configured to record an image signal generated in accordance with a recording operation in a first file;
   a displaying portion configured to display time elapsed during the recording operation and
   a subtraction time-managing portion for, when residual time to be recordable, as determined from a remaining capacity capable of recording the image signal in the first file depending on a file system of the recording portion and having a recordable capacity and a bit rate based on a quality of photographed image, is equal to or shorter than a predetermined warning display time, instructing the displaying portion to change the display of the time elapsed during the recording operation to displaying a time in which the amount of data reaches the capacity.

2. A portable image pickup device according to claim 1, wherein:
   the subtraction time-managing portion instructs the display portion to display the time in a form different from a time elapsed in the recording operation.

3. A portable image pickup device according to claim 1, wherein:
   the subtraction time-managing portion instructs the display portion to change display of the time in which the amounts of data reaches the capacity to display the time elapsed in the recording operation for a second file for which recording operation is newly started, where the amount of data reaches the capacity of the first file.

4. A portable image pickup device, comprising:
   a memory portion including a first file, a second file, and files subsequent to the first and second files;

a recording portion for recording an image signal generated in accordance with a recording operation in the first file;

a displaying portion for displaying the residual time;

A subtraction time-managing portion for, when a residual time to be recordable, determined from a remaining capacity capable of recording the image signal in the first file depending on a file system of the recording portion and having a recordable capacity and a bit rate based on a quality of photographed image, is equal to or shorter than a predetermined warning displaying time, instructing the displaying portion to change display of a time elapsed in the recording operation to display of a time in which the amount of data reaches the capacity.

5. A portable image pickup device according to claim 4, wherein:

the subtraction time-managing portion instructs the display portion to display the time in a form different from a time elapsed in the recording operation.

6. A portable image pickup device according to claim 4, wherein:

the subtraction time-managing portion instructs the display portion to change display of the time in which the amount of data reaches the capacity to display of time elapsed in the recording operation for a second file for which recording operation is newly started, where the amount of data reaches the capacity of the first file.

\* \* \* \* \*